United States Patent [19]
Rizzi et al.

[11] Patent Number: 5,588,356
[45] Date of Patent: Dec. 31, 1996

[54] CHAIN MOLD FOR PREPARING SOLID FOOD PRODUCTS, OR FILLED FOOD PRODUCTS, OF DIFFERENT THREE DIMENSIONAL SHAPES

[76] Inventors: Roberto Rizzi; Mario Rizzi, both of Via Trieste 62, Martinengo (Bergamo), Italy

[21] Appl. No.: 584,940

[22] Filed: Jan. 16, 1996

[30] Foreign Application Priority Data

Jun. 26, 1995 [IT] Italy .................... MI95A1365

[51] Int. Cl.$^6$ .................... A21C 3/06; A21C 9/00; A21C 11/00; A23P 1/00
[52] U.S. Cl. .................... 99/450.6; 99/450.1; 99/450.7; 425/383; 425/442
[58] Field of Search .................... 99/450.1–450.8, 99/494, 353–355; 425/298, 289, 218, 306, 327, 383, 442, 112, 131.1

[56] References Cited

U.S. PATENT DOCUMENTS

| | | | |
|---|---|---|---|
| 3,782,271 | 1/1974 | Tobey et al. | 425/298 X |
| 4,014,254 | 3/1977 | Ohkawa | 99/450.6 |
| 4,160,634 | 7/1979 | Huang | 425/112 |
| 4,537,121 | 8/1985 | Bero et al. | 99/450.1 X |
| 4,664,027 | 5/1987 | Pauron | 99/450.6 |
| 4,711,165 | 12/1987 | Codino | 99/353 |
| 4,848,218 | 7/1989 | Battaglia | 99/450.7 |
| 4,854,226 | 8/1989 | Chen | 99/355 X |
| 4,941,402 | 7/1990 | D'Alterio | 425/131.1 X |
| 4,996,914 | 3/1991 | D'Alterio | 99/450.6 |
| 5,010,807 | 4/1991 | Anderson et al. | 99/450.6 |
| 5,205,209 | 4/1993 | Tansini | 99/460.6 |
| 5,375,509 | 12/1994 | Taylor et al. | 99/450.6 |

*Primary Examiner*—Timothy F. Simone
*Attorney, Agent, or Firm*—Bucknam and Archer

[57] ABSTRACT

A chain mold comprises a supporting construction which is constituted by two shoulders supporting an upper shaft and axle and a bottom shaft and axle, all having horizontal parallel rotary axes, and on each of which is mounted a gear wheel, on the upper gear wheels being entrained an upper chain, whereas on the bottom gear wheels is entrained a bottom chain. The two chains have chain links which are mutually faced along a vertical intermediate plane and sequentially define dihedrical shape articles. The articles arranged on the bottom chain are provided with a cutting edge for cutting the food product bead. Each link of the upper chain slidably supports, along the dihedral shape articles, a pair of controllably movable half-molds, which can be mutually moved toward or away from a corresponding pair of half-molds supported by the opposite link in order to form a piece of food product from a food product bead supplied along the intermediate plane. The length of the mold is an essential parameter for assuring a proper configuration of the product. The mold is moreover provided with operating systems for adjusting the spacing of the aligned half-molds and in order to properly cut the food product bead.

10 Claims, 6 Drawing Sheets

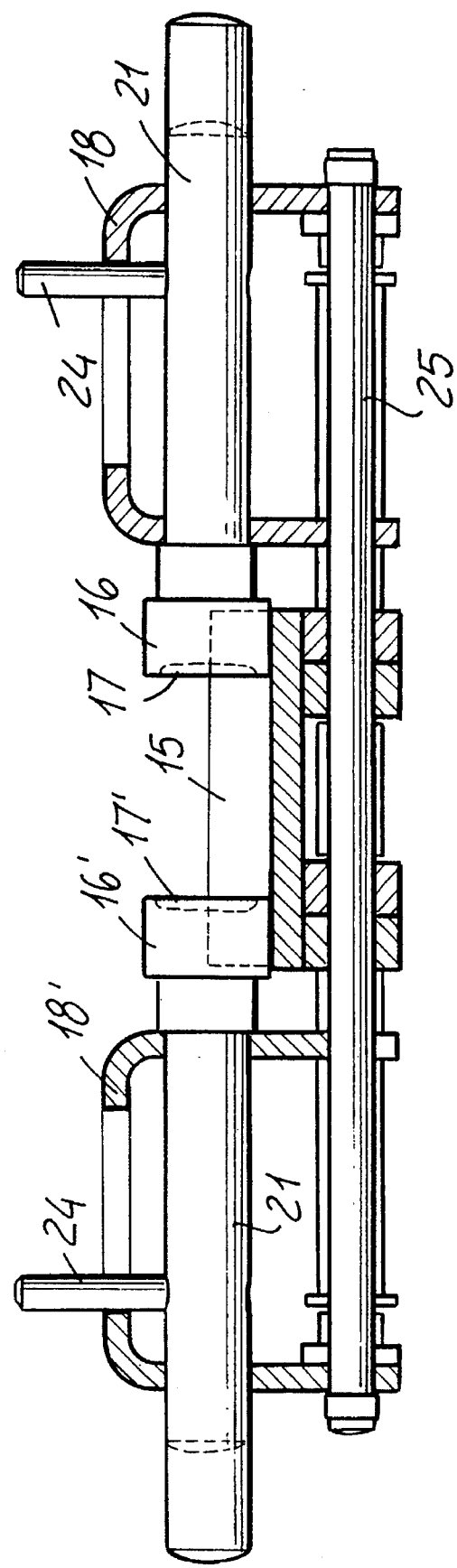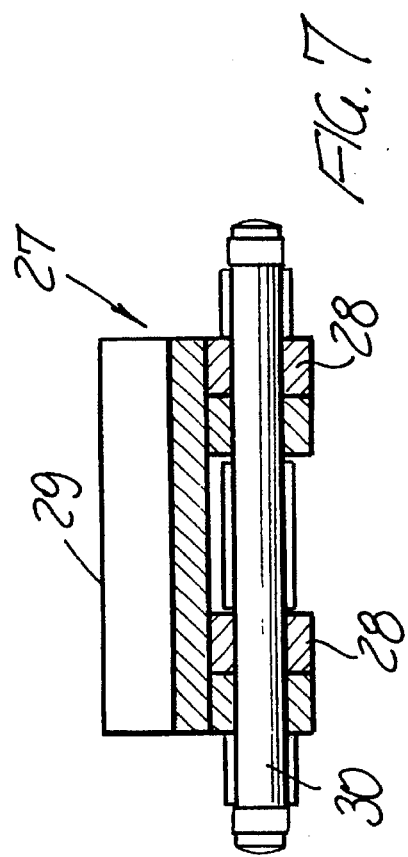

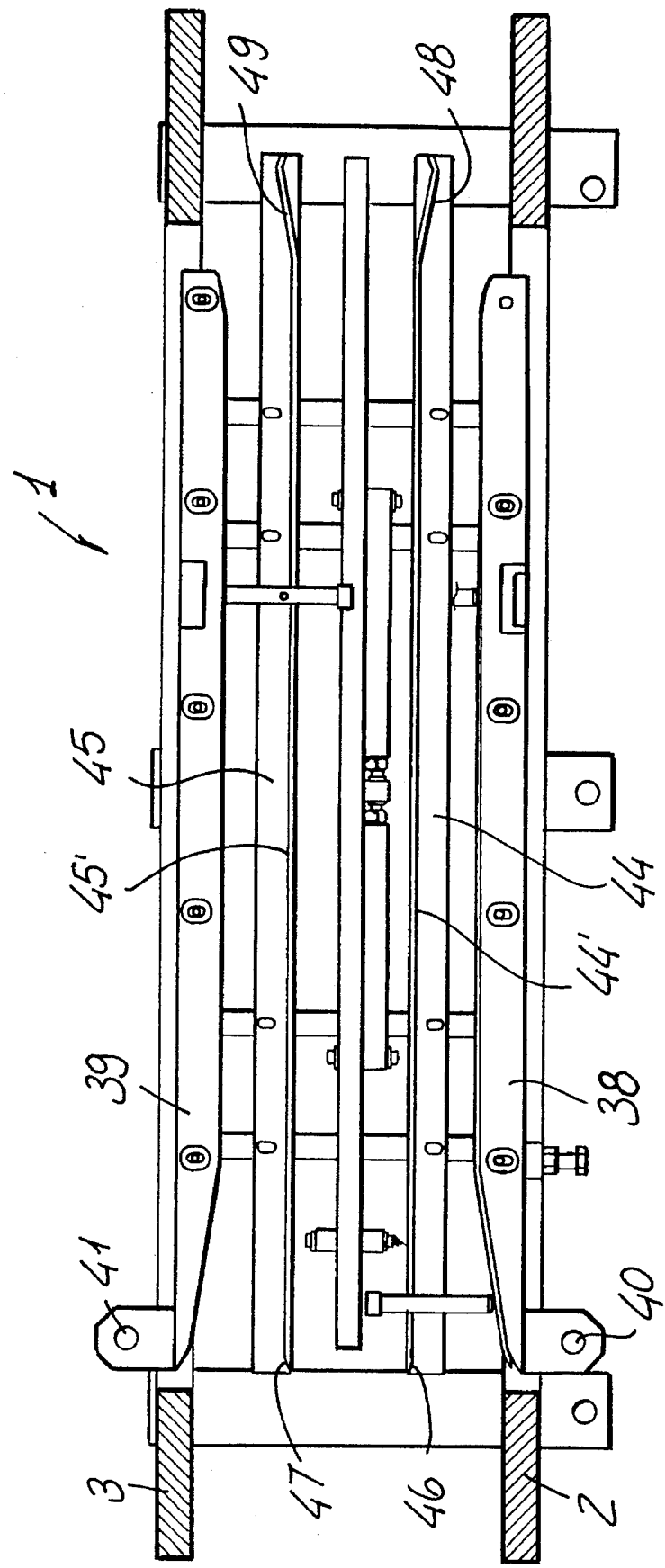

CHAIN MOLD FOR PREPARING SOLID FOOD PRODUCTS, OR FILLED FOOD PRODUCTS, OF DIFFERENT THREE DIMENSIONAL SHAPES

BACKGROUND OF THE INVENTION

The present invention relates to a chain mold for preparing solid food products, possibly filled-in food products, having very different three dimensional shapes.

Apparatus for making solid food products, and, in particular, filled food products, are already known which comprise substantially a rotary series of pairs of hollow punch elements, which mutually cooperate in order to provide individual food product pieces, starting from a continuous food product bead generally made by extrusion.

More specifically, the hollow punch element pairs of these apparatus, which can be mutually displaced towards one another or away from one another, are mounted on an upper chain, therewith is tangentially engaged a bottom chain supporting corresponding cutting elements which, by engaging with corresponding elements provided on the upper or top chain, cut the food product into pieces having a length corresponding to the pitch of the cutting elements.

These apparatus, however, are affected by drawbacks, mainly related to the adjustment of the tension of the two chains, thereby these apparatus frequently provide unsatisfactory end products.

Moreover, prior apparatus of the above mentioned type has a comparatively small size which does not allow to obtain a high product yield, even if the rotary speeds of the chain entraining gear wheels are brought to maximum values.

SUMMARY OF THE INVENTION

Accordingly, the object of the present invention is to overcome the above mentioned drawbacks, by providing a chain mold for preparing solid food products and, in particular, filled-in products, which permits the production of product pieces having perfectly finished three dimensional shapes.

Within the scope of the above mentioned object, a main object of the present invention is to provide a chain mold, for preparing or making solid food products, or filled-in food products, which assures a very high yield of food product pieces per hour.

Another object of the present invention is to provide such a chain mold for preparing solid and filled-in food products, which is very reliable and safe in operation.

According to one aspect of the present invention, the above mentioned objects, as well as yet other objects, which will become more apparent hereinafter, are achieved by a chain mold for making solid food products, in particular filled food products, having different three dimensional shapes, characterized in that said chain mold comprises a supporting construction, including two shoulders supporting an upper shaft and an upper axle, as well as a bottom shaft and a bottom axle having horizontal and parallel rotary axes, on each of said shafts and axles being mounted gear wheels respectively meshing with an upper chain and a bottom chain, said upper and bottom chains each having chain links which are mutually facing along a vertical intermediate plane and sequentially define dihedral shape articles, the dihedral shape articles of the bottom chain having a cutting edge for cutting a food product bead, the links of said upper chain slidably supporting each, along said dihedral articles, a pair of controllably movable half-molds, which can be driven toward or away from a corresponding pair of half-molds supported by an opposite link in order to form a food product piece from said food product bead supplied along said intermediate plane, said mold having a set length to provide a food product with a set proper shape, operating systems being moreover provided for controlling said half-molds in order to properly drive said half-molds and align them and to provide a precise cutting of said food product bead.

BRIEF DESCRIPTION OF THE DRAWINGS

Further characteristics and advantages of the chain mold, for making solid food products and, in particular, filled food products, according to the present invention, will become more apparent from the following detailed disclosure of a preferred, though not exclusive, embodiment of said mold, which is illustrated, by way of an indicative, but not limitative, example, in the figures of the accompanying drawings, where:

FIG. 6 is an enlarged, partially cross-sectioned view, of a length of the upper chain;

FIG. 7 is an enlarged and partially cross-sectioned view illustrating a length of the bottom chain;

FIG. 8 is a top plan view of the mold according to the present invention, in which only some component elements have been shown for purposes of clarity.

DESCRIPTION OF THE PREFERRED EMBODIMENT

Figure 1:
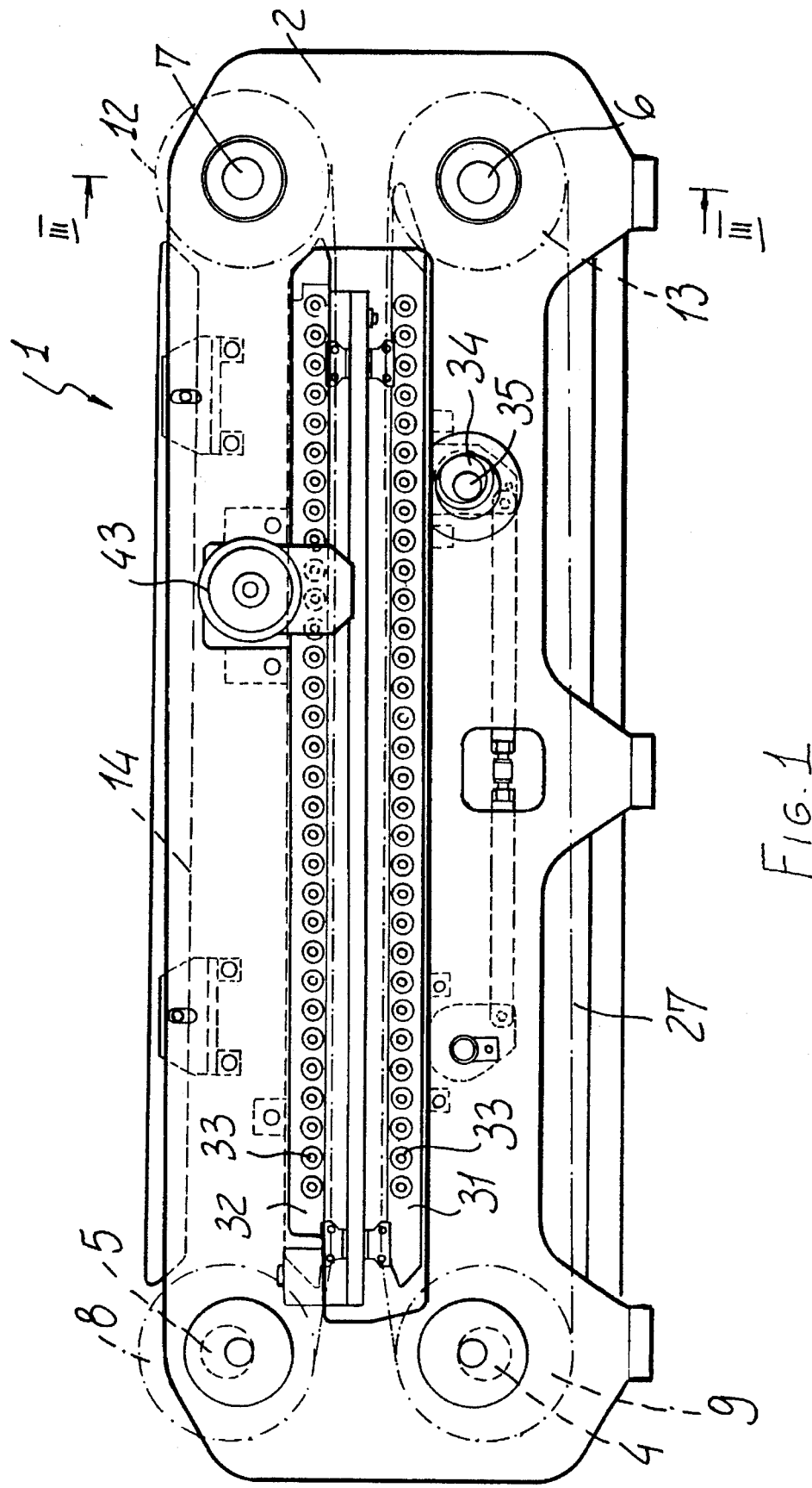
FIG. 1 is a schematic side elevational view illustrating a mold according to the present invention.
Figure 2:
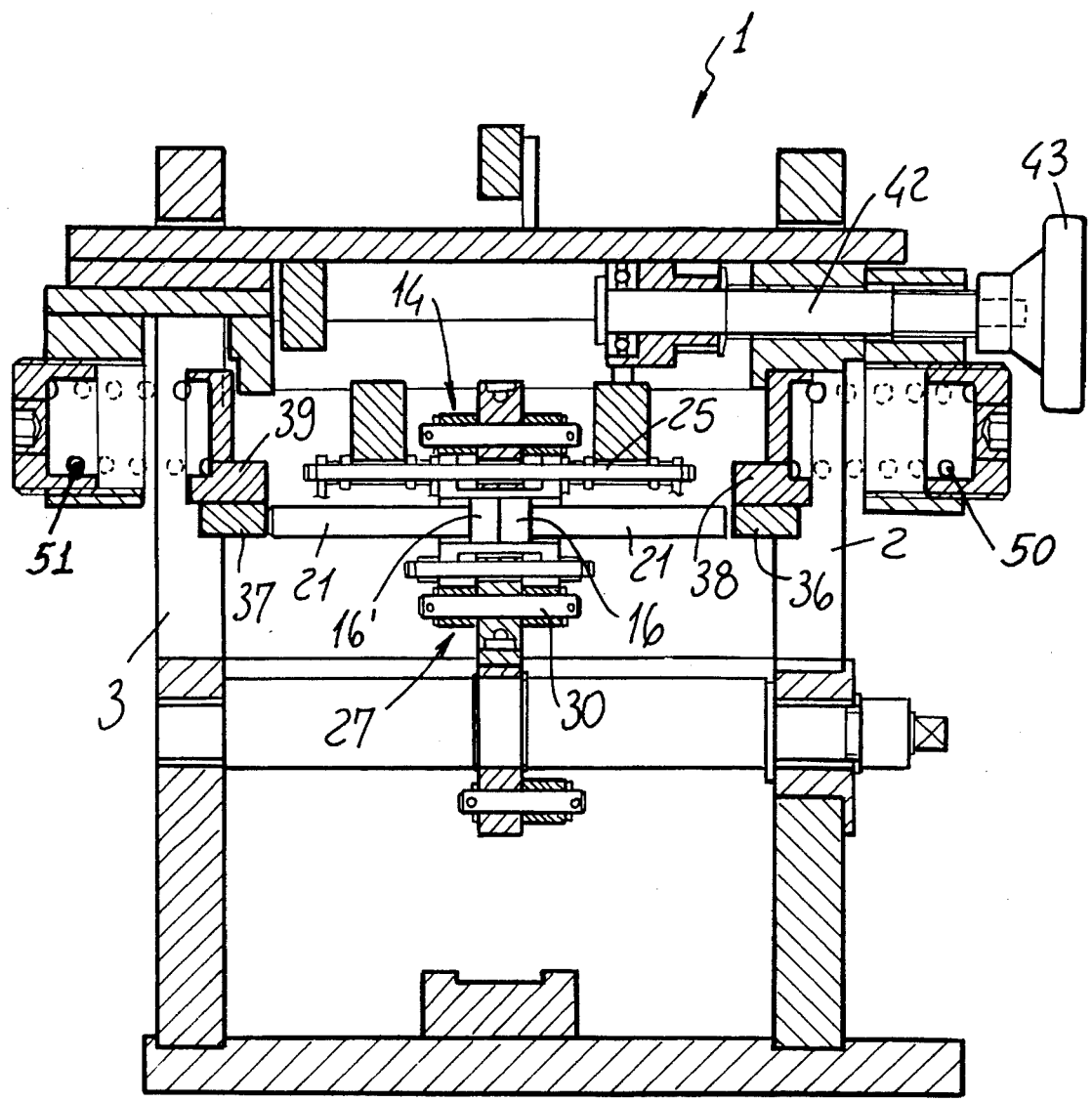
FIG. 2 is a schematic cross-sectional view illustrating the mold according to the invention, the cross section being taken in a vertical plane, at an intermediate region of the mold.
Figure 3:
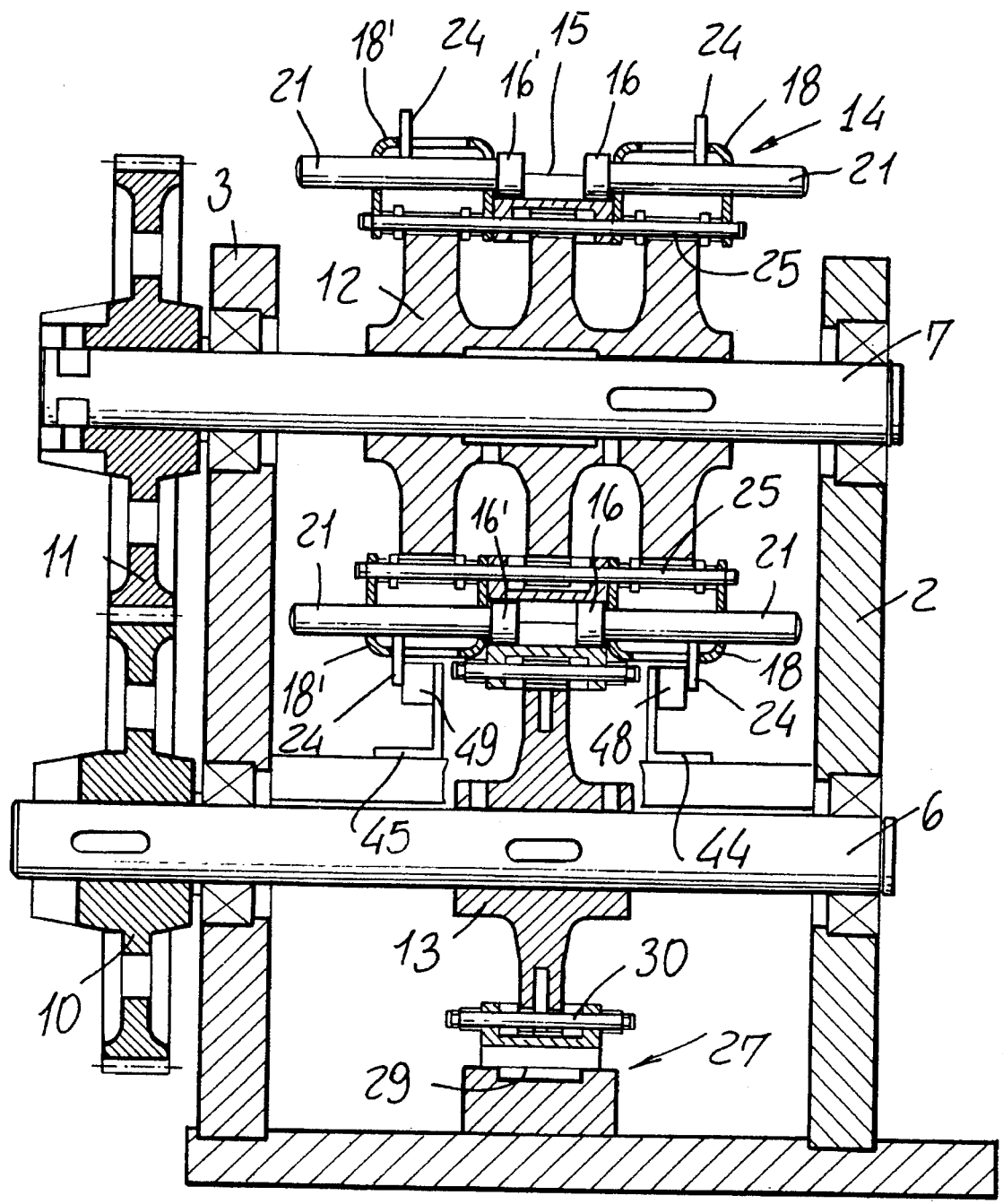
FIG. 3 is a further schematic cross-sectional view substantially taken along the line III–III of FIG. 1 and also illustrating the mold according to the invention.
Figure 4:
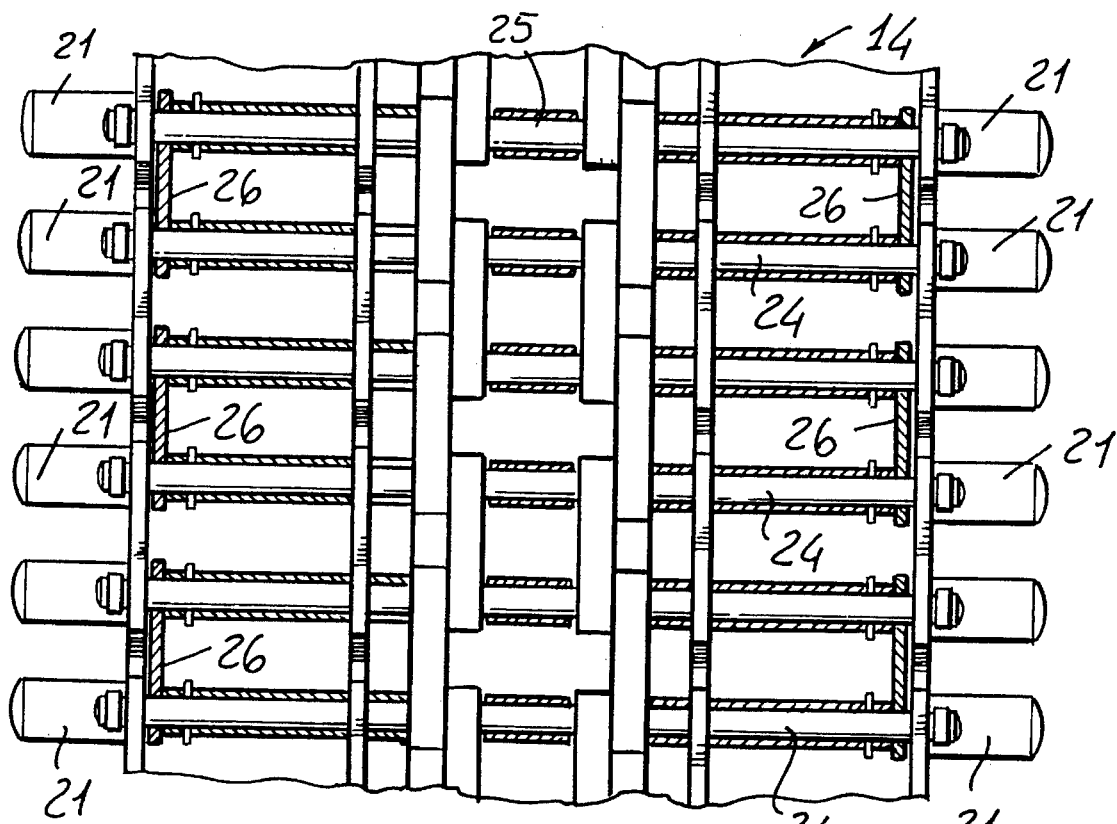
FIG. 4 is an enlarged top plan view, as partially cross-sectioned, illustrating a length of the upper or top chain.
Figure 5:
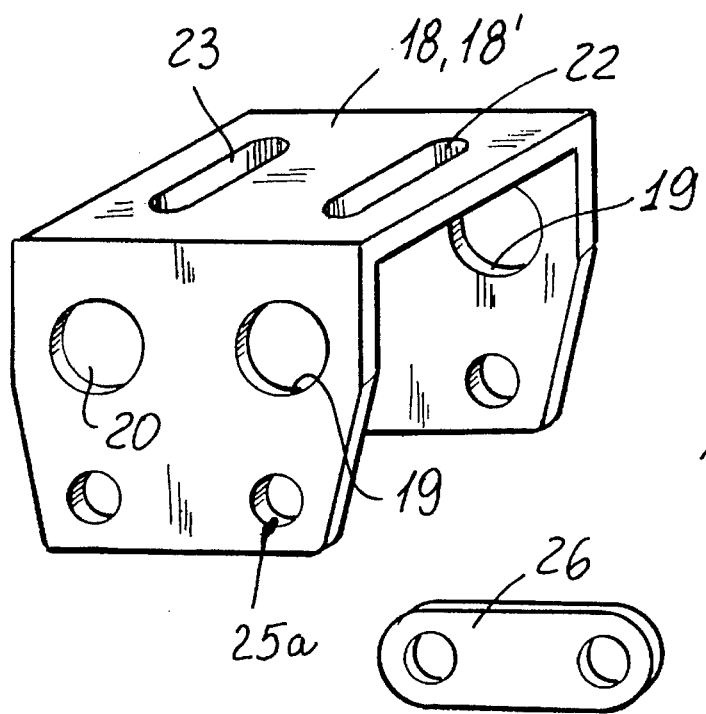
FIG. 5 is an exploded perspective view of a link of the upper or top chain.

With reference to the number references of the above mentioned figures, the chain mold according to the present invention, which has been generally indicated by the reference number 1, comprises a supporting construction, constituted by two shoulders having any suitable configurations and, in particular, a front shoulder 2 and a rear shoulder 3 supporting, at the end portions thereof, two axles, indicated by the reference numbers 4 and 5, and two shafts 6 and 7, all of which are horizontal and mutually parallel.

The axles and shafts arranged at longitudinal end portions of the mold are arranged in the same vertical plane.

Both on said axles and on said shafts are mounted gear wheels: on the axles said gear wheels, indicated by the reference numbers 8 and 9, are idly mounted, whereas the gear wheels mounted on the shafts, and indicated by the reference numbers 12 and 13, are rigid with said shafts.

The upper or top gear wheel 12, which is the entraining or driving gear wheel, can be variously located, by causing it to slide along the shaft 7, by operating pressure screws or like adjusting elements, equivalent from a mere functional standpoint.

The mutual displacement of the gear wheels 12 and 13 can be obtained by means of gears 10 and 11, one of which is a driven gear, which are mounted on the shafts 6 and 7.

The upper or top gear wheels 8 and 12 are made of three wheel rings and are engaged with a top or upper chain 14, including two rows of chain links, a front row and a rear row, which are mutually connected and face, on opposite sides, a vertical intermediate plane.

These links define articles provided with dihedral seats 15, therealong the links support, slidably, half-molds 16 and 16' which can slide in a direction perpendicular to the mentioned intermediate plane so as to mutually move towards one another or away from one another.

The half-molds 16 and 16' are provided, on their mutually facing faces or surfaces, with respective hollows or recesses 17 and 17' which reproduce, generally, the shape of the food product piece to be made by molding starting from a food product bead, which is supplied between said front links and rear links along said intermediate plane.

More specifically, the front links and rear links of the upper or top chain, indicated by the reference numbers 18 and 18', are substantially shaped as a reversed bracket and are provided, on the side walls thereof, with a pair of passages 19 and 20, slidably supporting a rod 2 1. The latter is provided, at the end portion thereof facing said intermediate plane, with a half-mold 16 and 16'.

Moreover, each front or rear link is provided, on the rear wall thereof, with a pair of slots 22 and 23 which are elongated in a direction perpendicular to said intermediate plane and each of which slidably receives a peg 24, which is transversely affixed to the related rod 21.

The front links 18, as shown, are connected to the rear links 18' by pins 25 passing through holes 25a of the links, and are successively mutually coupled along the respective row by means of plates 26 which connect to one another to adjoining pins 25.

Thus, each chain link will support two half-molds 16 and 16' each of which can slide inside a dihedral seat or recess 15.

The bottom gear wheels 9 and 13 engage with a bottom or lower chain 27. From an operating standpoint, this chain is constituted by chain links 28 defining dihedral edges 29 and which are mutually articulated by articulation pins 30.

The dihedral edges 29 are provided for contacting the corresponding edges of the top chain so as to cut the food product bead which is supplied at said intermediate plane.

The proper tensioning of the top and bottom chains is assured by the axles 4 and 5 which are suitably eccentrically arranged with respect to their supports.

Suitable bilateral pressure cams 31 and 32, with sealed ball bearings 33, for reducing to a minimum the operating friction, will facilitate the product cutting operation.

An outer wheel (not shown for simplicity) which can be controlled by the operator is arranged at the end portion of the small shaft 35 and by operating this wheel, through an eccentric mechanism 34, the operator can change the height position of the cam 31.

The mutual displacement of the half-molds 16 and 16' for forming the product pieces by molding and cutting the food product bead, is obtained by means of bilateral forming cams 36 and 37, thereagainst are engaged the end portions of the rods 21 arranged on the opposite side of said half-molds 16 and 16'.

More specifically, the cams 36 and 37 are affixed at the bottom, in an adjustable manner, to supporting elements 38 and 39 pivoted, at a longitudinal respective end portion thereof, to respective vertical pins 40 and 41 and which are subjected to the force of two springs 50 and 51, of suitable size, provided for controlling the pressure applied by the half-molds 16 and 16' on the food product bead.

The wheel 43, operated by the operator, will allow, through a small threaded shaft 42, to adjust in a timed manner the mutual displacement of the supporting elements 38 and 39 as well as of the cams 36 and 37, thereby controlling the stroke or movement of the rods 21, i.e. the approaching stroke of the half-molds 16 and 16'.

Inside the shoulders 2 and 3 of the mold are arranged elements 44 and 45.

These elements are substantially constituted by angle elements having a specifically designed shape of their vertical leg 44' and 45' so as to provide a lead-in portion, 46 and 47 respectively, at a starting position, and an outwardly respective diverging portion 48 and 49 at an end of operation position.

This will allow to simply and efficiently engage the two half-mold 16 and 16' to cause them to be mutually moved away: the elements 44 and 45, in other words, provide, from an operating standpoint, two bilateral removal cams.

With the vertical leg 44', 45' is engaged the peg 24 of the rod 21 so that, at the end portion 48, 49 of the vertical leg 44, 45 the two half-molds 16 and 16' can be mutually moved away.

From the above disclosure and the observations of the figures of the accompanying drawings, the great functionality and facility of use characterizing the chain mold for making solid food products, and in particular filled products, according to the present invention will be self evident.

While the invention has been disclosed and illustrated with reference to a preferred embodiment thereof, it should be apparent that the disclosed embodiment is suspect to several modifications and variations all of which will come within the inventive scope.

What is claimed is:

1. A chain mold for making solid food products, in particular filled food products, having different three dimensional shapes, said chain mold comprising:

a supporting contruction including two shoulders respectively supporting an upper shaft and an upper axle and a bottom shaft and a bottom axle having horizontal and parallel rotary axes;

gear wheels mounted on each of said shafts and axles respectively meshing with an upper chain and a bottom chain;

said upper and bottom chains each having chain links mutually facing along a vertical intermediate plane and sequentially defining dihedral shaped articles;

the dihedral shaped articles of the bottom chain having a cutting edge for cutting a food product bead;

each link of said upper chain slidably supporting along said dihedral articles, a pair of controllably movable half-molds which are movable toward and away from a corresponding pair of half-molds supported by an opposite link so as to form a mold for a food product piece from said food product bead supplied along said intermediate plane, said mold having a set length to provide a food product with a set proper shape; and operating systems provided for controlling said half-molds so as to drive said half-molds and align them to provide a precise cutting of said food product bead.

2. The chain mold as defined in claim 1, wherein said supporting construction comprises a supporting frame including said parallel shoulders supporting said upper shaft and axle and said bottom shaft and axle, said axles being arranged in a vertical plane at a first end portion of the chain mold, and said shafts being arranged in a vertical plane at a second end portion of the chain mold.

3. The chain mold as defined in claim 1, wherein said gear wheels mounted on said upper shaft and axle comprise three gear ring elements, and the gear wheels mounted on said bottom shaft and axle comprise a single ring gear type, said upper and bottom axles being eccentrically arranged with respect to their supporting element so as to properly tension said chains, the gear wheels mounted on said axles being idly mounted, and the gear wheels mounted on said shafts being rigidly rotatively mounted thereon, said upper and bottom shafts being connected to one another by connecting gears one of which is driven, and pressure screw adjusting elements are provided for changing the related position of the upper gear wheel with respect to the shaft on which it is mounted.

4. The chain mold as defined in claim 1, wherein the links of said upper chain have a substantially reversed bracket shape having a pair of passages defined in the side walls thereof, each of said passages receiving in a slidable manner a rod, said rod supporting at a longitudinal end thereof facing said intermediate plane one of said half-molds.

5. The chain mold as defined in claim 4, wherein each said rod is provided with a transverse peg projecting from a slot defined through the upper wall of the related link of the upper chain.

6. The chain mold as defined in claim 1, wherein said bottom chain of said chain mold is engaged between said bottom gear wheels and formed by chain links articulated by pins and operatively comprising dihedral shaped cutting edges.

7. The chain mold as defined in claim 1, wherein said chain mold further comprises pressure bilateral cams having pressure ball bearings for facilitating the cutting operation on said product bead supplied along said intermediate plane, and an outer wheel operated by an operator to change the height position of said cams articulated at one end thereof.

8. The chain mold as defined in claim 1, wherein said half-molds for forming said product pieces starting from said product bead supplied on said intermediate plane are driven by bilateral forming cams operating on said rods having at one end thereof said half-molds, and an operator controlled wheel is provided which is engaged on a small shaft thereby allowing said forming cams to be timely displaced, said cams rotating at one end portion thereof about a vertical pin in the direction of said intermediate plane, thereby allowing the thickness of the product being formed to be changed by changing the stroke of the rods on which said half-molds are mounted.

9. The chain mold as defined in claim 1, wherein said half-molds are displaced from one another by bilateral removal cams which have an angular configuration and a vertical leg of which forms at a start position a lead in position and, at an end position, a diverging arrangement for engaging with the pin of said rods so as to cause said half-molds to move away from one another.

10. The chain mold as defined in claim 1, wherein said mold has a set length specifically designed for providing a suitable cooling and a precise forming of a single food product piece.

* * * * *